United States Patent
Johnson et al.

(10) Patent No.: US 8,301,714 B2
(45) Date of Patent: Oct. 30, 2012

(54) METHOD AND SYSTEM FOR NETWORKING

(75) Inventors: Mark Johnson, Arradon (FR); Chris Hodgson, Ploeren (FR); Bertrand Ekoue, Questembert (FR)

(73) Assignee: Raymarine UK Limited, Havant, Hampshire (GB)

( * ) Notice: Subject to any disclaimer, the term of this patent is extended or adjusted under 35 U.S.C. 154(b) by 361 days.

(21) Appl. No.: 12/724,670

(22) Filed: Mar. 16, 2010

(65) Prior Publication Data

US 2011/0161455 A1 Jun. 30, 2011

(30) Foreign Application Priority Data

Dec. 30, 2009 (EP) ..................................... 09016109

(51) Int. Cl.
*G06F 15/16* (2006.01)
(52) U.S. Cl. ......... 709/209; 709/224; 709/227; 713/300
(58) Field of Classification Search .......... 709/200–203, 709/209, 217–227; 713/300
See application file for complete search history.

(56) References Cited

U.S. PATENT DOCUMENTS

| | | | |
|---|---|---|---|
| 2003/0114898 A1 | 6/2003 | Von Arx et al. | 607/60 |
| 2006/0244624 A1 | 11/2006 | Wang et al. | 340/815.67 |
| 2009/0315668 A1 | 12/2009 | Leete, III et al. | 340/3.1 |
| 2011/0025459 A1* | 2/2011 | Denison et al. | 340/5.51 |
| 2011/0050390 A1* | 3/2011 | Denison et al. | 340/5.51 |
| 2011/0050391 A1* | 3/2011 | Denison et al. | 340/5.51 |

OTHER PUBLICATIONS

Du et al., "Safari: A Self-Organizing, Hierarchical Architecture for Scalable ad hoc Networking", Ad Hoc Networks, Elsevier, vol. 6, No. 4, Feb. 20, 2008, pp. 485-507, XP022492474 ISSN: 1570-8705.
Nakjung Choi et al., "Random and Linear Address Allocation for Mobile ad hoc Networks", Wireless Communications and Networking Conference, 2005 IEEE New Orleans, LA, USA Mar. 13-17, 2005, Piscataway, NH, USA, IEEE, vol. 4, Mar. 13, 2005, pp. 2231-2237, XP010791525 ISBN: 978-0-7803-8966-3.

* cited by examiner

*Primary Examiner* — Moustafa M Meky
(74) *Attorney, Agent, or Firm* — Haynes and Boone, LLP

(57) ABSTRACT

A method of wirelessly networking a system of at least first and second communication nodes includes obtaining a common power source for the at least first and second communication nodes, switching on the common power source, and establishing a power-up time. Each of the first and second communication nodes is capable of tracking the time since the power-up time. The method includes sending a start signal from one of the first and second communication nodes, wherein the start signal occurs after the power-up time and includes at least information of the elapsed time since the power up time. The method includes networking the other of the first and second communication nodes with the one of the first and second communication nodes sending the start signal, if the elapsed time of the other of the first and second communication nodes approximately matches the elapsed time provided in the start signal.

12 Claims, 3 Drawing Sheets

FIG. 1
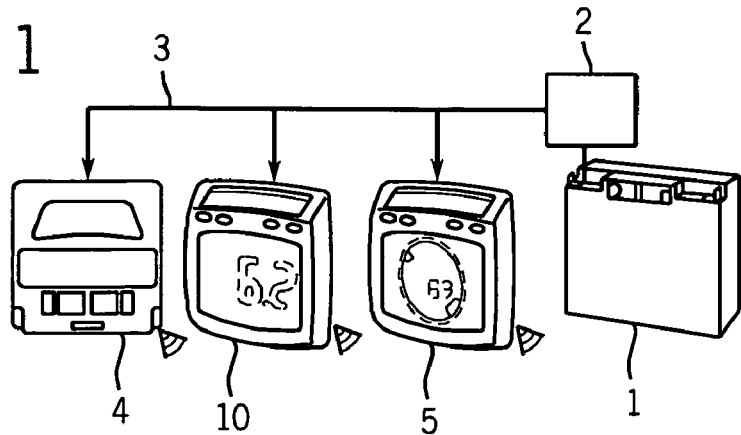
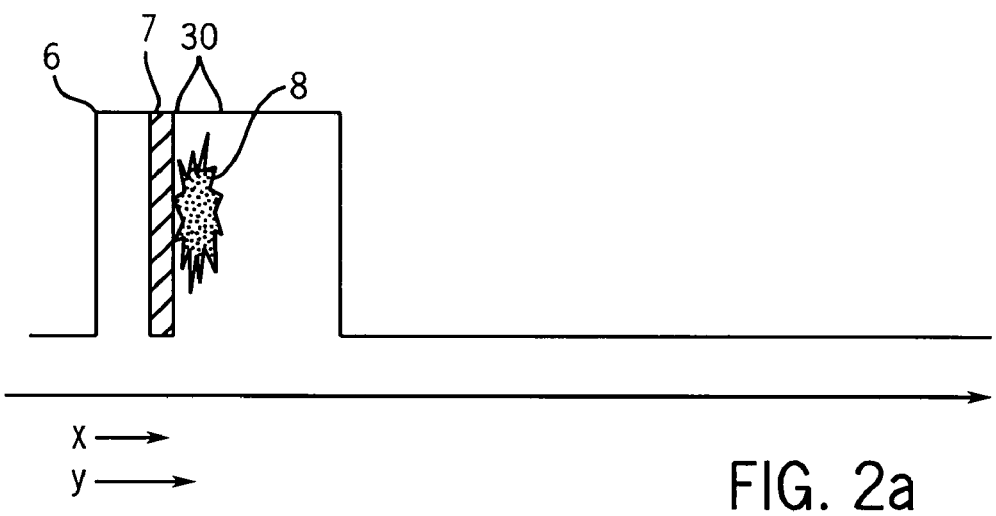
FIG. 2a
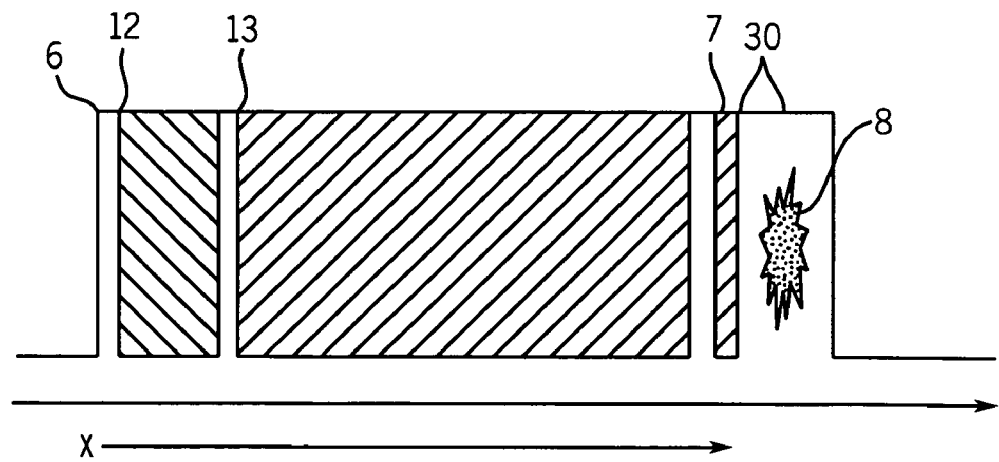
FIG. 2b

METHOD AND SYSTEM FOR NETWORKING

RELATED APPLICATION DATA

The present invention claims the benefit of the filing date under 35 U.S.C. §119(a) of European Patent Application No. 09016109.2/EP09016109, filed on Dec. 30, 2009, which is hereby incorporated by reference in its entirety.

FIELD OF THE INVENTION

The present invention relates to a method of networking and a networking system.

BACKGROUND OF THE INVENTION

The present invention relates to a method of networking at least first and second communication nodes. In prior art solutions, networking different wireless elements has been either burdensome because of all security measures in connection with the networking or alternatively security issues have been compromised.

Networking together elements of a radio or wireless network generally requires user intervention such as keying in a common key, switching "DIP" switches to the same point, or being in close proximity during a networking phase. These solutions all require user input, and often require users to refer to user guides. This introduces problems of user frustration and user error and can lead to incorrect networking, with too few or too many nodes joining a network. These approaches also require time and expense to complete.

What is needed is a system that eliminates at least some of the drawbacks of the prior art disclosed above and that creates a reliable, effective and entirely new type of method and system for networking devices.

SUMMARY OF THE INVENTION

The invention is based on resolving the above problem for instances where radio (wireless) nodes share a common power supply, e.g. the nodes on a boat which are wired to the same fuse/breaker. A networking event is triggered when a radio node powers up from an external supply at exactly the moment as another radio node. From this, as the result of power-up radio communications, the nodes conclude they are wired to the same breaker, and they become part of the same network, e.g. by sharing a network address.

The radio protocol includes a mechanism wherein one radio node acts as the network Master node and starts other nodes with a start signal. The other nodes which see the start signal immediately on booting up from the arrival of external power can interpret this "start signal arrival just at the moment of boot up" to be a networking event, and join the network of the Master node.

In one embodiment of the present invention, only a certain time window is allowed for the slave nodes to network with the master node.

In accordance with the principals of the present invention, a method of wirelessly networking at least first and second communication nodes includes the steps of obtaining a common power source for the at least first and second communicating nodes, and sending a start signal from the first communication node. The start signal is triggered by the power-up time of the power source. The method further includes initiating a first predetermined cut off time window beginning immediately after the start signal and ending at a first predetermined time period after the start signal, and networking the first communication node with the at least second communication node provided that the networking is completed within the first predetermined time period.

According to another aspect of the present invention, a method of wirelessly networking a system of at least first and second communication nodes includes obtaining a common power source for the at least first and second communication nodes, and switching on the common power source and establishing a power-up time. Each of the at least first and second communication nodes is capable of tracking the time since the power-up time. The method further includes sending a start signal from one of the at least first and second communication nodes, wherein the start signal occurs after the power-up time of the power source and includes at least information of the elapsed time since the power up time. The method also includes networking the other of the at least first and second communication nodes with the one of the first and second communication nodes sending the start signal, if the elapsed time of the other of the at least first and second communication nodes approximately matches the elapsed time provided in the start signal.

According to another aspect of the present invention, a networking method of includes the following steps. Networking at least two wirelessly communicating nodes sharing a common power source, one of the nodes sends a start signal triggered by the power up time of the power source, or sends after power up a signal including at least information of the elapsed time from power up, and at least one of the rest of the nodes networks with the initiating node if the start signal is received within a predefined time window from the switching on of the power source, or if the signal is received after power up, where its elapsed time matches that indicated in the signal.

According to another aspect of the present invention, a networking method of includes the following steps. Networking at least two wirelessly communicating nodes sharing a common power source, one initiating node being capable of sending a start signal triggered by the power up time of the power source, or sending after power up a signal including at least information of the elapsed time from power up, and at least one additional node being capable to network with the initiating node if the start signal is received within a predefined time window from the switching on of the power source, or if a signal is received after power up, where its elapsed time matches that indicated in the signal.

According to another aspect of the present invention, a wireless communication system includes first and second communication nodes and a first power supply operably coupled to the first and second communication nodes. Each of the first and second communication nodes includes a transceiver or a transmitter and receiver, and a memory. The first power supply has an on position wherein power is supplied to the first and second communication nodes and an off position wherein power is terminated to the first and second communication nodes. Each of the first and second communication nodes is configured to track elapsed time from the receipt of power from the first power supply. The first communication node is configured to send a first signal at a first time period from the receipt of power to the first communication node from the first power supply. The first signal includes the first time period. The second communication node is configured to receive the first signal and to compare the first time period of the first signal to a second time period. The second time period is the elapsed time from the receipt of power to the second communication node from the first power supply until the receipt by the second communication node of the first signal. The second communication node is configured to accept the first signal if the first time period matches the second time period within a predetermined tolerance range, and not to accept the first signal if the first time period does not match the second time period within a predetermined tolerance range.

The wireless communication system can further include a third communication node that is operably coupled to a second power supply. The second power supply is different from the first power supply. The second power supply has an on position wherein power is supplied to the third communication node and an off position wherein power is terminated to the third communication node. The third communication node is configured to track elapsed time from the receipt of power from the second power supply. The third communication node is configured to send a third signal at a third time period from the receipt of power to the third communication node from the second power supply. The third signal includes the third time period. The first and second communication nodes are configured to receive the third signal and to compare the third time period of the third signal to fourth and fifth time periods, respectively. The fourth and fifth time periods represent the elapsed time from the receipt of power to the first and second communication node from the first power supply, respectively, until the receipt of the third signal. The first and second communication nodes are configured to accept the third signal if the third time period matches the fourth and fifth time periods within the predetermined tolerance range, and not to accept the third signal if the third time period does not match the fourth of the first time periods within the predetermined tolerance range.

The networking method and the networking system of the invention may also be associated with any of the following features in any technically acceptable combination. One of the nodes acts as a master node and the start signal can be triggered by the switching on of the power source. One of the nodes which produces a first signal to the network sends the start signal and other nodes take its network address if the power up timing is essentially the same. One of the nodes which produces a first measurement to the network sends the start signal and other nodes take its network address if the power up timing is essentially the same. One of the nodes which produces a first signal during manual network start sends the start signal and other nodes take its network address if the power up timing is essentially the same. One of the nodes produces a first random start signal and other nodes take its network address if the power up timing is essentially the same. The networking nodes take the master node's network address as their own network address.

Means are provided for a further step, where a non master node networked with a battery operated node becomes a master node at the next switching on of the power source. The time window can be about 1-6000 ms, and preferably is around 300 ms after the start pulse. An ending of the start pulse is considered as any subsequent event proportional to the time when the actual start signal is complete. The time window is formed at the end of the start signal such that the allowed time window for networking starts from the power up added by power up time, signal sending time and end of the start signal time and ends after the predetermined time window after the end of the end of the start signal.

Considerable advantages are gained with the aid of the invention. The invention allows easy assembly of several network nodes with sufficient safety. The invention is especially advantageous in boat and car solutions, where the network consists of only few nodes powered from the same battery and the network works based on short range transmission. Further, networking event can be triggered without user intervention, if two or more radio enabled nodes see a power up event at the same moment in time. By the networking in accordance with the invention it is possible to automatically accept the network address of another node who shares the same power supply.

Further, when mixing by 12V cable powered and independently battery powered nodes, networking can still be made to work. This requires the network address of the battery nodes i.e. nodes without power supply timing information to dominate, so that the powered nodes move to the network address of independently powered nodes.

This invention will become more fully understood from the following detailed description, taken in conjunction with the accompanying drawings described herein below, and wherein like reference numerals refer to like parts.

BRIEF DESCRIPTION OF THE DRAWINGS

FIG. 1 illustrates a network system configuration according to a preferred embodiment of the present invention.

FIG. 2a illustrates graphically a timing diagram of the system of FIG. 1.

FIG. 2b illustrates the timing diagram of FIG. 2a in more detail.

DETAILED DESCRIPTION OF THE INVENTION

Figure 3:
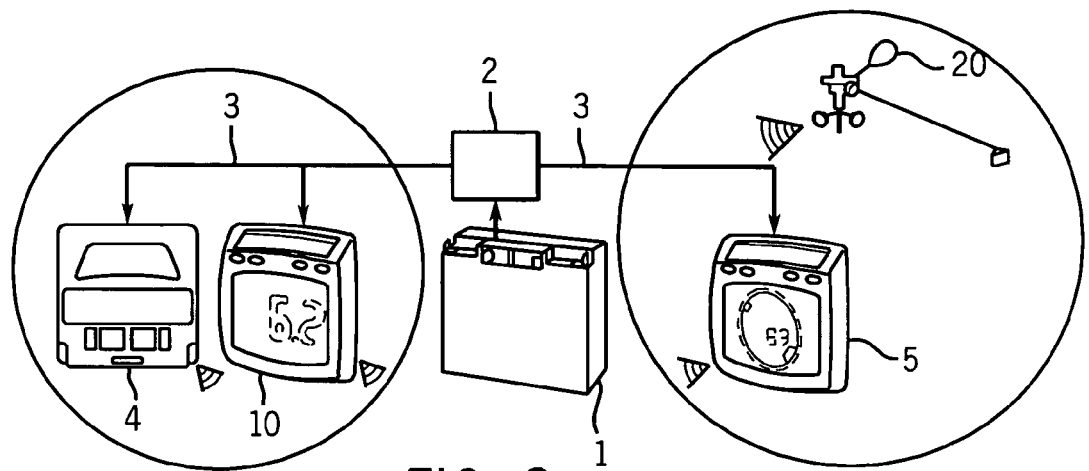
FIG. 3 illustrates a network system configuration in accordance with an alternative preferred embodiment of the present invention.

Referring to FIG. 1, in one preferred embodiment of the present invention, a system includes three nodes 4, 10 and 5, a common power supply 1 and a circuit breaker 2. The three nodes 4, 10 and 5 are wired through a set of wires 3 to the common power supply 1 and the circuit breaker 2.

Each node 4, 10 and 5 preferably has a wireless transceiver, a memory and a timer (or the capability to track the elapsed time between or from particular signals or events), allowing communication between each of the nodes 4, 10 and 5, and, when produced, each node 4, 10 and 5 preferably includes a unique network address. Alternatively, two or nodes could be specifically initially configured to share a network address. When the nodes 4, 10 and 5 do not share the same network address initially, they do not communicate data with each other and do not appear to be part of the same network. In alternative preferred embodiments, one or more of the nodes can include a separate receiver and transmitter in lieu of a transceiver.

One of the nodes can be designated as the Master node. Such designation can be made by the initial system installers. Alternatively, one of the nodes can be designated as the Master node in other manners, such as, for example, original design, by the user, by a technician or other means. In one particularly preferred embodiment, node 5 can set by an installer as the system Master, which means node 5 will attempt to bring other nodes 4 and 10 into a network automatically as part of its boot up process. The remaining nodes, nodes 4 and 10, are designated as slave nodes.

Referring also to FIG. 2a, a timing diagram of the system of FIG. 1 is illustrated. The system includes several events including a power up 6, a start signal 7, a flashnetworking event 8, and a cut off time window 30. The power up 6 occurs when the circuit breaker 2 is made (or closed). In one embodiment, the release of a reset of an onboard micro controller can also be required as part of the power up 6. Following the power up 6, the Master node (node 5) issues the start signal 7. The start signal 7 is a special flag indicating first communication by the Master 5 node following boot up of the system including Master node 5. The start signal 7 from the Master node 5 preferably occurs at a fixed known delay x from the power-up 6. The delay x can be any preselected duration. In one particularly preferred embodiment, the delay x can be approximately 8 milli-seconds (ms). In another preferred embodiment, x can be approximately 8 seconds. In other alternative preferred embodiments, other values for x can also be used. Immediately following the start signal 7, the flashnetworking event 8 occurs, wherein upon seeing the start signal 7, the slave nodes 4 and 10 join the network of the Master node 5 by taking the network address of the Master node 5 as their own network address. This process of taking on the Master's network address may be called FlashNetworking.

Time y indicates the time from the power up 6 to the point where the slave nodes 4 and 10 receive the start signal and flashnetworking occurs. The response time for slave nodes 4 and 10 to flashnetwork with the Master node 5 (time y minus time x) typically occurs within the range of 5 to 20 ms. However, normal system tolerances and error ranges can result in durations for slave node response that are greater than 20 ms.

A predetermined cut off time window 30 is initiated after the start signal 7 to establish a timeframe for the flashnetworking of the slave nodes (nodes 4 and 10) to occur in the system. The time window 30 is selected from a range of approximately 1 ms to 6000 ms. In one particularly preferred embodiment, the time window 30 can be approximately 300 ms. In other particularly preferred embodiments, other time frames can also be used. When the cut off time window 30 expires, flashnetworking is terminated. Signals received after the cut off time window 30 are assumed to be signals from another network, i.e. the nodes are not wired to the same breaker and the Flashnetworking event 8 does not arise. Accordingly, establishing an appropriate duration for the cut off time window 30 is important to the system. Selecting a cut off time window 30 that is too short, can prevent the flashnetworking of the desired slave nodes from occurring. Alternatively, selecting a cut off time window 30 that is too long can increase the chances of inadvertently networking undesired nodes as slave nodes. The 300 ms precision for the cut-off time window 30 is a compromise, suited to one particular preferred application. A shorter duration would reduce the risk that another network in range is, by chance, started at almost the same instant in time, causing two separately wired networks to accidentally become merged. A longer duration would make the system easier to implement, as timing x is measured by clocks, which have limited accuracy. In one preferred embodiment, the system has a value of 8 ms for x is 8 ms after the breaker is made, and y is 5 to 20 ms later than x, depending on the network loading. In another alternative preferred embodiment, the value for x is 8 seconds. It is desirable to select a cut off time window 30 that allows for flashnetworking of the desired slave nodes without significantly increasing the chances of flashnetworking other non-targeted and/or undesired nodes.

If the end of start signal 7 of any other nodes is within the predetermined time window 30, in other words in a window in which the time from the power up 6 is at least x but less than x+300 ms, the networking happens. When the flashnetworking event 8 occurs within the cut off time window 30, all three nodes 4, 10 and 5 now share the same network address and so full networking behaviour arises for the remainder of the operating session.

In a preferred embodiment, the network address can be retained permanently by the slave nodes 4 and 10. In this case, future power up events will not generate further Flashnetworking events, the slave nodes 4 and 10 will automatically recognize the network address of the master node 5 and immediately communicate as part of a single network. In an alternative preferred embodiment, the network address could be reset on power down of the system, in which case a Flashnetworking event would be triggered on each subsequent power cycle so that the slave nodes 4 and 10 would share the network address of the master node 5.

Referring to FIG. 2b, the timing of the system is shown in greater detail. Line x represents the time taken to complete the issuance of the start signal 7, and the start signal 7 itself typically requires a duration of approximately 3 ms. Alternatively, other durations can also be used. Under the time x following the power up 6, boot-up time 12 and signal sending time 13 occur before the start signal 7 (the start pulse) is initiated.

Area 12, the boot-up time 12, immediately follows the power up 6 and represents the warm up time for the crystals of the nodes 4, 10, and 5. This area 12 represents a changeover from the low precision internal chip resonator to the high precision external watch crystal, and this changeover time 12 typically takes about 2 s (±150 ms). In alternative preferred embodiments, other time frames can also be used for the boot-up time.

Large area 13, the signal sending time 13, represents the start signal from the master node 5 which is a series of 10101010 lasting typically 6 s. In alternative embodiments, other durations can be used. Signal sending time 13 is a network sending signal intended for communication with wireless nodes, typically battery operated nodes such as, for example, a node 20 of FIG. 3. Battery operated nodes will typically search for signals periodically to conserve battery life. The signal time 13 extends over a longer time period so that the signal is present when the battery operated node enters a search mode. Once received the signal from time 13 initiates boot-up or start up of the battery operated node.

The time duration of the areas 13 and 7 is known and precise to microseconds. However, the changeover or boot-up time 12 is dependent on the watch crystal characteristics, the temperature and the system battery voltage in the case of a battery powered unit. This is why in the embodiment in accordance with the invention is left a 300 ms tolerance on comparisons of elapsed times.

Figure 4:
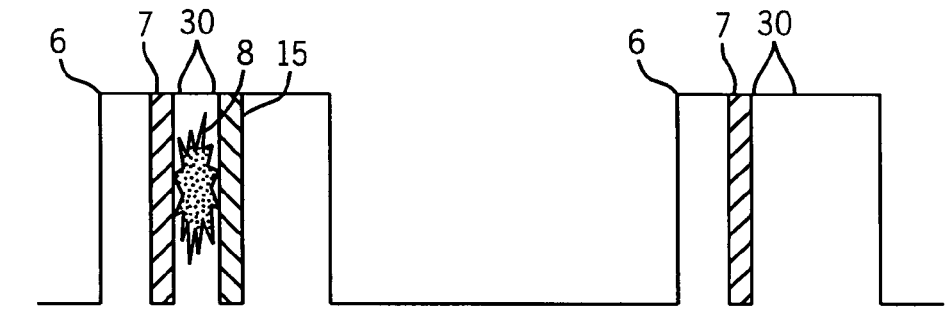
FIG. 4 graphically illustrates a timing diagram of the system of FIG. 3.

Referring to FIGS. 3 and 4, an alternative preferred embodiment of a network system is illustrated. The system includes the following nodes. The node 5 can be a wind display 5, the node 20 can be a wind sensor 20, the node 4 can be a hull transmitter 4 and node 10 can be a speed display 10. In the embodiment of FIG. 3, the nodes are configured for use on a boat. Although a boat is referenced, it is done so as an example. The present invention is applicable to other applications and configurations.

In the example of FIG. 3 nodes, a wind display 5 and a wind sensor 20 already share the same network address i.e. are networked already. The enlarged circle of FIG. 3 represents that the wind display 5 and the wind sensor 20 already share the same network address. The other two nodes, the hull transmitter 4 and the speed sensor 10 are wired to the same circuit as the wind display 5 and therefore share the breaker and the same power supply 1. The wind sensor 20 is a battery operated device and therefore does not share the same power source as the wind display 5 or as the hull transmitter 4 and the speed sensor 10.

Each of the nodes 4, 5 and 20 contains a wireless transceiver, allowing communication with the other nodes. The hull transmitter 4 and the speed display 10 may have a unique network address, or may already be networked, i.e. share their own network address, different to the wind nodes. When the breaker 2 is made (closed), power arrives simultaneously at all three of the 12V powered nodes 4, 10 and 5 for the first time.

The present invention contemplates multiple approaches to networking the nodes of the present system. In one preferred embodiment, the wind display 5 can be configured as the network Master node. In this scenario, the hull transmitter 4 and the speed display 10 will Flashnetwork independently and Flashnetworking is complete. In other words, the hull transmitter 4 and the speed display 10 are slave nodes that share a common power supply with the master node, wind display 5. The hull transmitter 4 and the speed display 10 will each flashnetwork with the wind display 5 as illustrated by power up 6, the start signal 7 and the flashnetwork event 8 of FIG. 4. After the flashnetwork event 8, all the nodes 5, 20, 4 and 10 share the wind network address and are all now part of the same network.

In an alternative preferred embodiment or scenario, one of the new nodes, such as the hull transmitter 4 or the speed display 10 can be configured as the network Master node. Then, the wind display 5 may serve as one of the slave nodes and Flashnetwork. However, the wind display 5 cannot be flashnetworked alone (unilaterally), or it will leave the wind transmitter 20 left alone on its existing network address. The wind transmitter 20 operates on a separate power supply from the power supply 1, and therefore the wind transmitter cannot Flashnetwork as it has no visibility of the 12V breaker 2. However, referring to FIG. 2b, signal 13 is provided prior to the start signal 7 to allow for communication between the master node, either hull transmitter 4 or the speed display 10, with the battery operated slave node, the wind transmitter 20. After the signal 13 is received by the wind transmitter 20, the wind transmitter 20 is receptive to the start signal 20 and to the flashnetworking event 8. Referring to FIG. 4, after flashnetworking, on first power cycle, the master node, the hull transmitter 4 or the speed display 10, requests by signal 15 that the other nodes "join its network at the next power up", knowing that it had a battery powered devices (the wind transmitter 20) already networked in its previous power cycle. At the next power on cycle, all units 4, 10 and 5 then cleanly power up, having adopted the address of the existing wind network 20 and 5.

In another alternative preferred embodiment, none of the nodes 4, 10 or 5 may be configured to be the network master node. As a result, Flashnetworking cannot happen and the user will be left with the existing network, wherein nodes 5 and 20 share the same network address, but new nodes 4 and 10 operate separately. In this scenario, the user will need to configure one of the nodes 4, 10 or 5 to be Master node. This is encouraged because setting one of the nodes 4, 10 or 5 as the Master node gives an automatic network start up feature when the breaker 2 is made.

Accordingly, the present invention enables two or more nodes of a system to be powered by a common power source and one or more additional nodes of a system to be powered by independent battery power. The following steps can be used to address such a configuration. The nodes 4, 5 and 10 can check to see whether a separate battery powered units (or node) is already logged into its own network.

If a node, for example, the hull transmitter 4, is configured as a slave node and the hull transmitter 4 has not previously been linked to battery powered units, then the hull transmitter 4 is free to take the address of the Master (e.g. wind display 5) and Flashnetworking is complete. Other nodes (e.g. the speed display 10), which have previously been linked to, will independently come to the same conclusion and will themselves Flashnetwork to the Master, the wind display 5.

Referring to FIGS. 3 and 4, if a node, for example, wind display 5 has previously been networked to a battery powered unit (e.g. the wind sensor 20), then this unit will not be able to perform Flashnetworking as it does not know about the timing of the 12V breaker being made. Therefore the node 5 can take the address of the Master for this session only, i.e. it must put into Flash memory its original network address for recovery at the next power up 6. It must then issue a Flash-enlist instruction 15 containing its original network address, so that the Master and other nodes on the Master's network can store the address in non-volatile memory. At the next power cycle 6, in other words the next time the 12V breaker 2 is engaged, all units will then start on the network address of the node 5 which had battery power units 20 in its network and all nodes including battery nodes which can't directly Flashnetwork will be sharing the same network address and will be networked.

Figure 5:
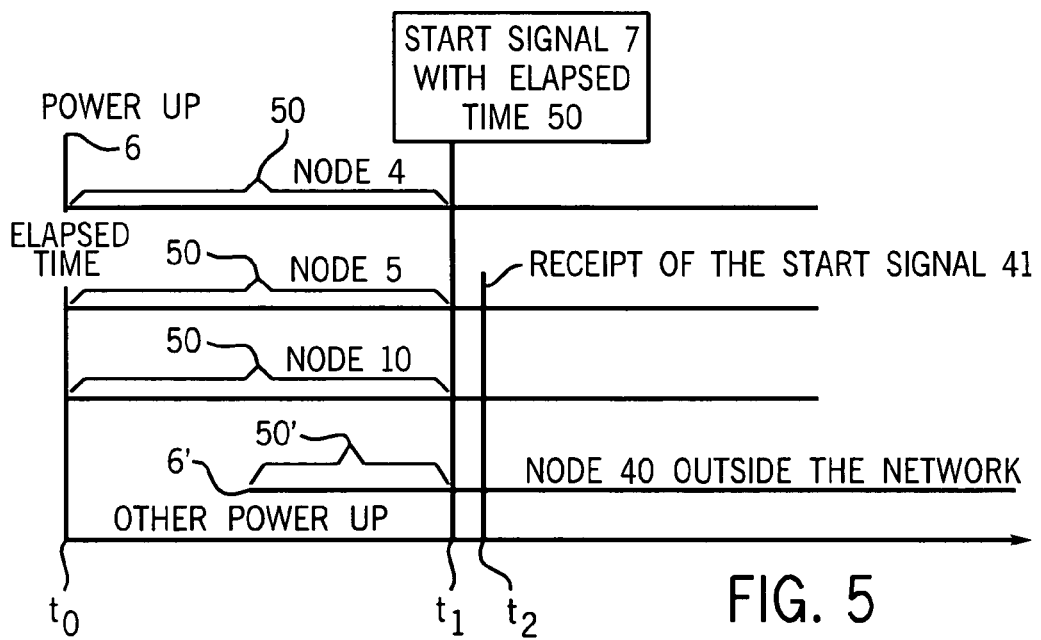
FIG. 5 graphically illustrates a timing diagram of a network system configuration in accordance with another alternative preferred embodiment of the present invention.

In alternative preferred embodiments, the system can employ a system master to produce a timing "Master strobe" which other nodes can recognize and Flashnetwork to. FIG. 5 illustrates one system configuration incorporating a Master strobe. Many other mechanisms are envisaged and contemplated in accordance with the present invention.

In this embodiment, several nodes (e.g. nodes 4, 5 and 10) can be utilized in a system. The nodes 4, 5 and 10 each share a common power supply. No node is initially identified as a Master node. Each node performs a particular function (e.g., measure a heartbeat, measure a cadence interval, measure a wind speed, etc.). A node, for example the node 4, can unilaterally communicate, through the start signal 7, when it completes its first measurement of a parameter such as a heartbeat interval, a cadence interval, a wind speed etc. Embedded in the start signal communication 7 can be an "elapsed time" 50 since the start up or power up 6 of the system, which could for example be measured in microseconds (ms). Any other node 5 or 10 seeing this first communication 7 would compare the time elapsed 50 with its own 50. On finding the two elapsed times to be matching (or to within a predetermined acceptable band, such as the measurement precision of the clocks in the embodiment within 1 to 30 ms), the Nodes 5 and/or 10 can then unilaterally flashnetwork with the first communicating node 4, by absorbing its network address. Multiple nodes would unilaterally Flashnetwork simultaneously because they all see this first communication, the start signal 7 that includes the elapsed time 50, and all compare elapsed times in the same way.

If a node that is outside of the network, e.g. a node 40, is within range of the first communicating node, the node 4, the node 40 will have a different elapsed time 50' and therefore will not network. The time between receipt of signal 41 and sending of the start signal 7 ($t_2-t_1$) can be easily taken into account, because this time is accurately enough fixed. For example, the time $t_2-t_1$ may be subtracted from the elapsed time 50 of the receiving nodes 5 and 10 or alternatively the sending node 4 may add time $t_2-t_1$ to its elapsed time 50 to make the times 50 comparable with sending 4 and receiving nodes 5 and 10. The evaluation of elapsed time 50 can be considered using a time window for acceptance of a start signal 7 in accordance with the invention. In other words, only such nodes 5 and 10 receiving a start signal powered within the same time window (elapsed time 50) will be accepted to the network.

In a variation of the scenario above, the first communication, the first start signal 7, can arise from a user activity such as manually turning the network on or manually actuating one of the nodes. This would avoid the user having to set Master On, or the network having to have a formally defined Master node.

There can also be an "other nodes discovery" mechanism where at a random time, a specific message is issued by each node, indicating its network address and elapsed time. Other nodes, on hearing this, would compare with their elapsed times and Flashnetwork if there is a match. There would be risk of message collision if two or more nodes happened to issue their messages simultaneously, but this would eventually resolve itself if random backoff and retransmit were employed, or if the message was repeated a number of times with random delays between each repetition.

In accordance with the invention an ending of the start pulse 7 is considered as any subsequent event proportional to the time when the actual start signal 12, 13, 7 is complete. In other words, the time window may be deleted by a constant time or a known variable for the other nodes 4, 10 or 5.

Flashnetworking can occur under several different scenarios or configurations. In one scenario, Flashnetworking can arise when the Node 4, 10, 5 sees the start signal 7 with the expected elapsed time since power up 6. This requires one node 4, 10 or 5 to issue a start signal 7, and other nodes to compare elapsed time with expected elapsed time for nodes wired to the same breaker 2.

Alternatively, networking can arise at any time after power up 6, if transmissions contain elapsed time information, so that receiving nodes can compare the sender's view of elapsed time with their own, and a match to within 300 ms (or other FIG.) can instigate flashnetworking.

In another configuration, one or more battery powered nodes can live in harmony with flashnetworking even if the battery powered nodes can't measure elapsed time. This is achieved with a mechanism where the battery powered node in a system sends out a "network to me" message 15, so that at the next power up, all nodes log onto the battery node network.

Figure 6:
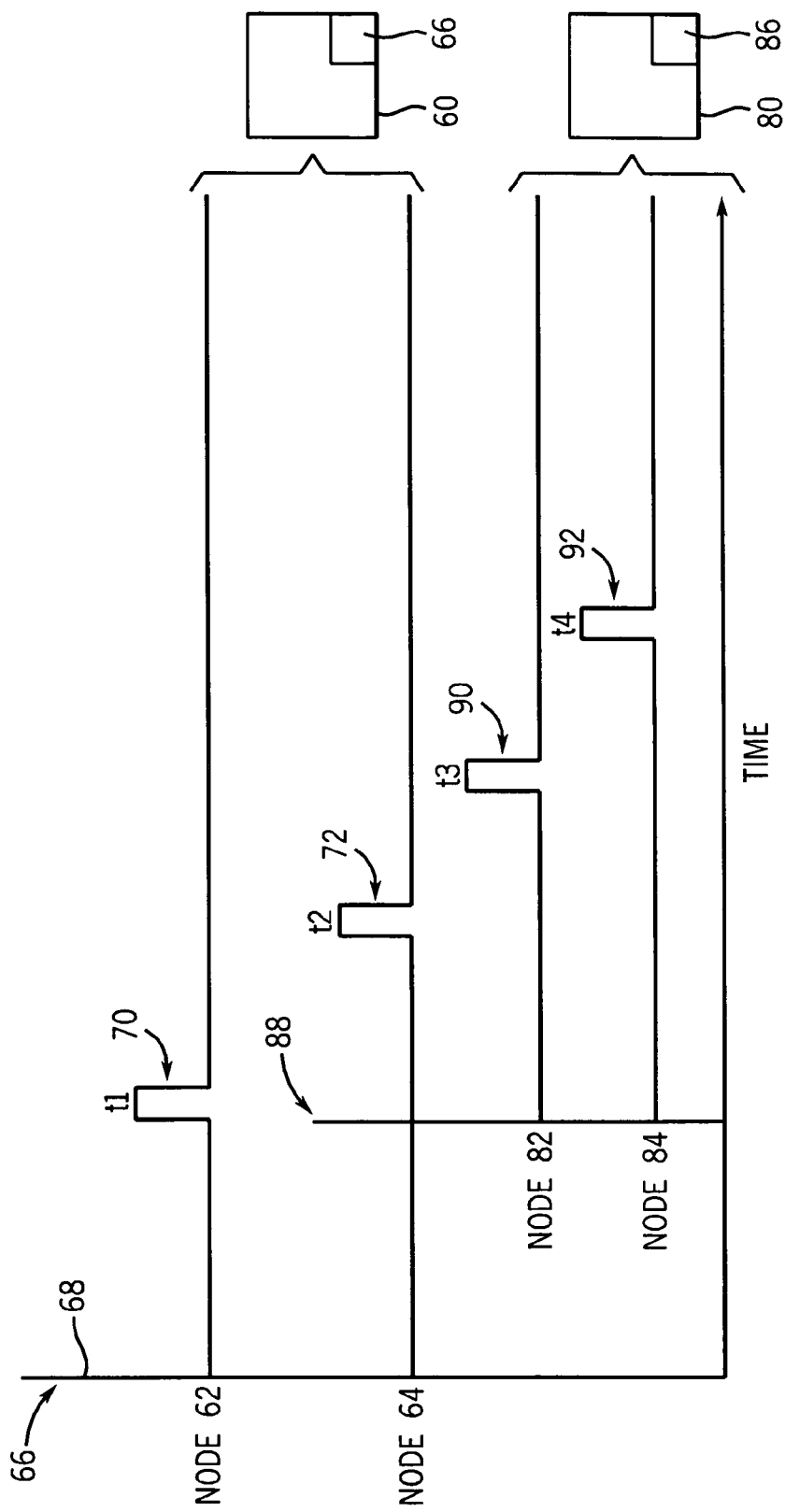
FIG. 6 graphically illustrates a timing diagram of a network system according to another preferred embodiment of the present invention.

Referring to FIG. 6, another preferred embodiment of the present invention is illustrated. FIG. 6 displays a timeline illustrating communication and networking between nodes having wireless communication capability installed on two different systems. In particular, FIG. 6 illustrates two wireless nodes present on first and second vehicles 60 and 80. Although vehicles are referenced here, the present invention is applicable to any structure or system that includes one or more wireless nodes that share a common power supply. The first and second vehicles 60 and 80 each include two wireless nodes, nodes 62 and 64 and nodes 82 and 84, respectively. In alternative preferred embodiments, the first and second vehicles 60 and 80 could each include 3, 4, 5 or more nodes. The nodes 62 and 64 can communicate wirelessly and share a power supply 66, and the nodes 82 and 84 can also communicate wirelessly and share a power supply 86. The nodes can be any electronic device having wireless communication capability, such as, for example, a portable gps device, a phone, a rear view camera, etc.

Communication between the nodes can occur in the following manner The first vehicle 60 starts at point 68 (or $t_0$) and power is supplied simultaneously to the nodes 62 and 64 from the power source 66 of the first vehicle 60. At point $t_1$, node 62 transmits a message or signal 70. The message or signal 70 can be a measurement of elapsed time, the time $t_1$, since the start point 68. The message 70 can also include one or more (or none) of the following additional types of information or content, a start signal, a data signal, a message, a network address, a measurement and a code. The node 64 receives the signal 70. The node 64 also keeps count of the elapsed time since the start point 68. The node 64 compares it's elapsed time at receipt of the signal 70 form the node 62 with the elapsed time measurement included in the signal 70. If the elapsed time kept by the node 64 matches the elapsed time included with the signal 70 from the node 62 within a predetermined tolerance range, then the node 64 will consider its elapsed time and the elapsed time included within the signal 70 from the node 62 to be a match. The node 64 accepts the signal 70 as a message from an onboard network (onboard the same vehicle). The signal 70 accepted by the node 64 can include only the elapsed timing information and therefore communication can occur in the future between the nodes 62 and 64. In alternative preferred embodiments, the signal 70 can also include timing information and measurement data, key press data or any other data.

In one preferred embodiment, the predetermined tolerance range is 300 µs. In alternative embodiments, other time frames for the predetermined tolerance range can also be used, such as, for example, a time frame between 300 µs to 300 ms or between 5 to 20 ms. The objective is to select a predetermined tolerance range that is sufficiently long enough to allow for onboard nodes to communicate effectively taking into account tolerances, normal delays in starting up or transferring of signals without becoming too long and opening the onboard nodes to communication with other nodes from other vehicles or other systems.

Communication between the nodes can also occur under the following scenario. The vehicle 60 can start at the start point 68. At a time after the start point 68 of the vehicle 60, the vehicle 80 moves within range of the vehicle 60. The vehicle 80 has a start point 88 occurring at time $T_0$ in which the power supply 86 of the vehicle 80 energized the nodes 82 and 84. Time $T_0$ occurs later than, or after, the start point 68 at $t_0$, and the time difference between $T_0$ and $t_0$ is greater than the predetermined tolerance range. If the node 64 transmits a signal 72 at time $t_2$, the node 62 sees the signal 72 and compares its elapsed time (the time from the start point 68 ($t_0$) up to the time of receipt of the signal 72 at time $t_2$ with the elapsed time value included in the signal 72. If these times are within the predetermined tolerance range (e.g. within 300 µs), the node 62 will see a match and consider the message to be from the onboard network of the vehicle 60. However, the nodes 82 and 84, which are now within the communication range of 64, also can receive the signal 72. The nodes 82 and 84 compare the elapsed time within the signal 72 with their own particular elapsed time since their start up point 88 occurring at point $T_0$. Because the elapsed times from the start points 68 and 88 are not within the predetermined tolerance range, the elapsed times do not match and so the nodes 82 and 84 can conclude that they do not share the same onboard network as the node 64, and vice-versa.

In another communication scenario, the node 82 can transmit a message or a signal 90 at time t3. The nodes 62 and 64 can receive the signal 90 and compare their own elapsed time from their start point, the start point 68, with the elapsed time included with the signal 90. The nodes 62 and 64 see that the elapsed times do not match within the predetermined tolerance range, so the nodes 62 and 64 recognize that the message is from another vehicle and not the vehicle 60. The node 84, however, sees a match between its elapsed time from the start point 88 and the elapsed time included in the signal 90. Therefore, upon seeing the match, the node 84 recognizes that the signal 90 comes from the same vehicle, the vehicle 80.

In another communication scenario, the node 84 transmits a message or signal 92 at time $t_4$ from the start point 88. The nodes 62 and 64 can receive the signal 92 and compare their own elapsed time from their start point, the start point 68, with the elapsed time included with the signal 92. The nodes 62 and 64 see that their elapsed times do not match the elapsed time included in the signal 92 within the predetermined tolerance range, so the nodes 62 and 64 recognize that the message 92 is from another vehicle and not their vehicle 60. The node 82, however, sees a match between its elapsed time from the start point 88 and the elapsed time included in the signal 92. Therefore, upon seeing the match, the node 82 recognizes that the signal 92 comes from the same vehicle, the vehicle 80.

Accordingly, under the present invention, flashnetworking between two or more wireless communication nodes can occur based simply upon elapsed time from start up. In this manner, the networking occurs without sharing a network address or other system specific codes etc. Rather, if two or more communication nodes have the same elapsed time from start up at the transmission and receipt of a signal from one node to another (within a predetermined tolerance range), then flashnetworking between the nodes will occur. An actual transmission and receipt of a specific network address or code is unnecessary to allow for networking of these communication nodes. If the nodes do not have the same elapsed time within the predetermined tolerance range, then the nodes will not operate as if on the same network.

In another aspect of the present invention, the wireless communication nodes can be configured to not network together if they do not share the same elapsed time within the predetermined tolerance range, but still receive, accept, record or process other information a signal from an out of network node. In other words, two wireless communication nodes using different power supplies and having different startup times and therefore different elapsed times from transmission and receipt of signal from one node to another, will not flashnetwork but may still be configured to store, record, accept or process data or information that is present in the signal from the out of network node.

The present invention allows wireless nodes (such as the nodes 62, 64, 82 and 84) to be plugged into, or otherwise installed or removably installed, into any vehicle (or other structure or system) or swapped between vehicles without requiring the user or other service provider to re-network the vehicle, the system or the individual node or nodes. For example, a hand held navigator device, when plugged into the cigarette lighter of a vehicle (thereby sharing the power supply of the vehicle) can be recognized and networked automatically with the other electronic components of the vehicle or other nodes on the network of the vehicle. In another example, in a vehicle production line, installed wireless electronics would not have to be configured to match a particular vehicle. Under the present invention, the wireless electronics of such a production line vehicle would automatically form a network (or network). Such a system would save manhours and reduce costs. After sales service would also be simplified because a replacement wireless component (or node) would not require reworking or reconfiguration in order to join, or operate within, the network of the vehicle.

It is also contemplated that mismatched communication signals or messages would not be ignored. A mismatch in elapsed or received times between nodes doesn't necessarily mean the message of the mismatched signal is ignored. It only means that the signal comes from a different network, such as, for example, a different vehicle. The information in the mismatched signals may still be used by the separate network or networks. The present invention contemplates use of such mismatched communications for various purposes. The mismatched signals can be used to share historical data, present operating conditions, maintenance history, maintenance status, share information, etc.

While the preferred embodiments of the invention have been illustrated and described, it will be appreciated that various changes can be made therein without departing from the spirit and scope of the invention. Accordingly, it will be intended to include all such alternatives, modifications and variations set forth within the spirit and scope of the appended claims.

What is claimed is:

1. A wireless communication system comprising:
   a first communication node;
   a second communication node;
   wherein the first and second communication nodes are configured to receive power from a first power supply at a power up time;
   wherein the first and second communication nodes are configured to track first and second respective elapsed times since the power up time;
   wherein the first communication node is configured to send a first signal to the second communication node including the first elapsed time;
   wherein the second communication node is configured to receive the first signal and to compare the first elapsed time with the second elapsed time; and
   wherein the second communication node is configured to communicate data with the first communication node if the first elapsed time matches the second elapsed time within a predetermined tolerance range.

2. The wireless communication system of claim 1, wherein the predetermined tolerance range is a time frame selected from approximately 300 μs to approximately 300 ms.

3. The wireless communication system of claim 1, wherein the predetermined tolerance range is within approximately 300 μs.

4. The wireless communication system of claim 1, wherein the second communication node is configured not to communicate data with the first communication node if the first elapsed time does not match the second elapsed time within the predetermined tolerance range.

5. The wireless communication system of claim 4, wherein the second communication node is configured to store, receive or process data or information present in the first signal.

6. The wireless communication system of claim 1, wherein the power up time is a first power up time, the system further comprising a third communication node, wherein the third communication node is configured to receive power from a second power supply at a second power up time.

7. The wireless communication system of claim 6,
   wherein the third communication node is configured to track a third elapsed time since the second power up time;
   wherein the third communication node is configured to send a second signal to the first and second communication nodes including the third elapsed time;
   wherein the first and second communication nodes are configured to receive the second signal and to compare the third elapsed time with the first and second elapsed times; and wherein the first and second communication nodes are configured to communicate data with the third communication node if the third elapsed time matches the first and second elapsed times within the predetermined tolerance range.

8. The wireless communication system of claim 7, wherein the first and second communication nodes are configured not to communicate data with the third communication node if the third elapsed time does not match the first and second elapsed times within the predetermined tolerance range.

9. The wireless communication system of claim 1,
wherein the first and second communication nodes are configured with different network addresses before the second communication node communicates data with the first communication node; and wherein the first and second communication nodes share a common network address after the second communication node communicates data with the first communication node.

10. The wireless communication system of claim 1, wherein the first and second communication nodes each comprise at least one of a transceiver, a transmitter, or a receiver.

11. The wireless communication system of claim 1, further comprising the first power supply, wherein the first power supply is configured to selectively provide the power to the first and second communication nodes.

12. The wireless communication system of claim 1, wherein the first and second communication nodes are configured to communicate additional data without requiring another comparison of the first and second elapsed times.

* * * * *